US011579793B2

(12) United States Patent
Masuda et al.

(10) Patent No.: US 11,579,793 B2
(45) Date of Patent: Feb. 14, 2023

(54) STORAGE SYSTEM AND DATA PROCESSING METHOD

(71) Applicant: Hitachi, Ltd., Tokyo (JP)

(72) Inventors: Naoyuki Masuda, Tokyo (JP); Ryusuke Ito, Tokyo (JP); Kenichi Oyamada, Tokyo (JP); Yuri Hiraiwa, Tokyo (JP); Goro Kazama, Tokyo (JP); Yunde Sun, Tokyo (JP); Ryosuke Kodaira, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 5 days.

(21) Appl. No.: 17/207,308

(22) Filed: Mar. 19, 2021

(65) Prior Publication Data
US 2022/0100381 A1 Mar. 31, 2022

(30) Foreign Application Priority Data
Sep. 29, 2020 (JP) .............................. JP2020-164002

(51) Int. Cl.
*G06F 3/00* (2006.01)
*G06F 3/06* (2006.01)
*G06F 16/11* (2019.01)

(52) U.S. Cl.
CPC ............ *G06F 3/065* (2013.01); *G06F 3/0604* (2013.01); *G06F 3/0689* (2013.01); *G06F 16/128* (2019.01)

(58) Field of Classification Search
None
See application file for complete search history.

(56) References Cited

U.S. PATENT DOCUMENTS

| 11,079,961 B1 * | 8/2021 | Meiri .................... G06F 3/0613 |
| 2012/0311261 A1 | 12/2012 | Mizuno et al. |
| 2021/0034303 A1 * | 2/2021 | Alexeev .............. G06F 11/3409 |

FOREIGN PATENT DOCUMENTS

JP 2014507693 A 3/2014

\* cited by examiner

*Primary Examiner* — Midys Rojas
(74) *Attorney, Agent, or Firm* — Procopio, Cory, Hargreaves & Savitch LLP

(57) ABSTRACT

The functions of a mainframe environment are expanded by leveraging the functions of an open environment. A second storage of an open system externally connected to a first storage of a mainframe system comprises a second main volume of an open environment generated in association with a main logical device of the second storage, and a second sub volume of an open environment generated in association with a sub logical device of the second storage; the first storage comprises a first main volume of a mainframe environment generated in association with the main logical device of the second storage, and a first sub volume of a mainframe environment generated in association with the sub logical device of the second storage; when the first storage receives a data processing request from a host, the first storage reflects the processing request in the second storage and completes the processing; and when the first storage receives an execution request of a prescribed function, the first storage causes the second storage to execute the function.

8 Claims, 22 Drawing Sheets

FIG. 8

☐OP/MF ATTRIBUTE TABLE

| VOL# | ParityGroup# | OP/MF ATTRIBUTE |
|---|---|---|
| 1 | 1 | MF |
| 2 | 2 | MF |
| 3 | 1 | OP |
| 4 | 2 | OP |

FIG. 9
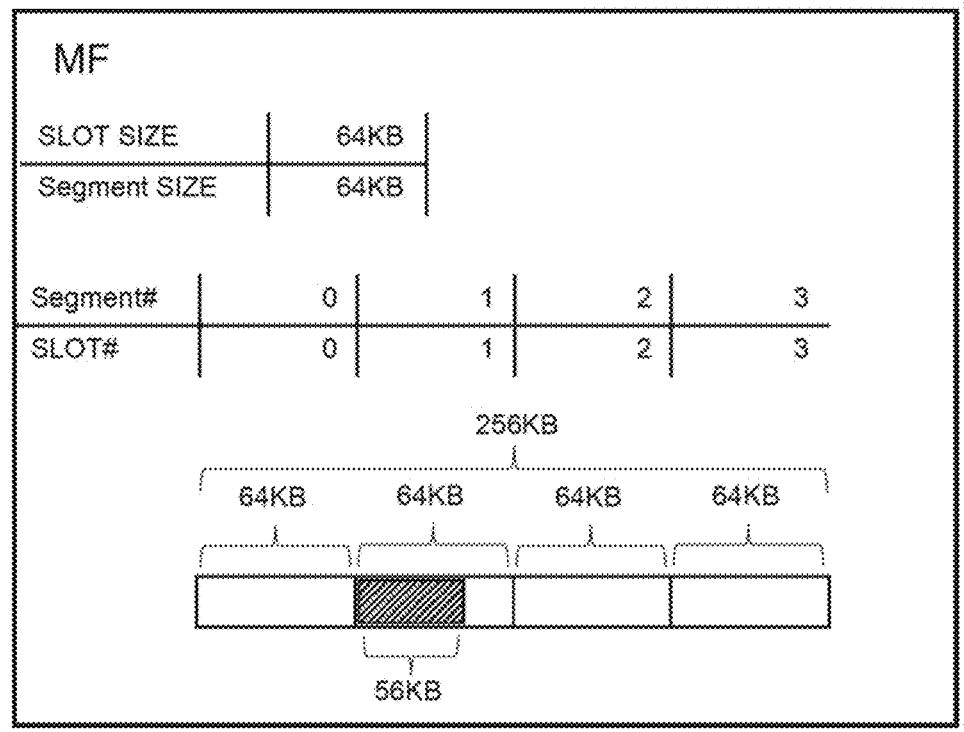
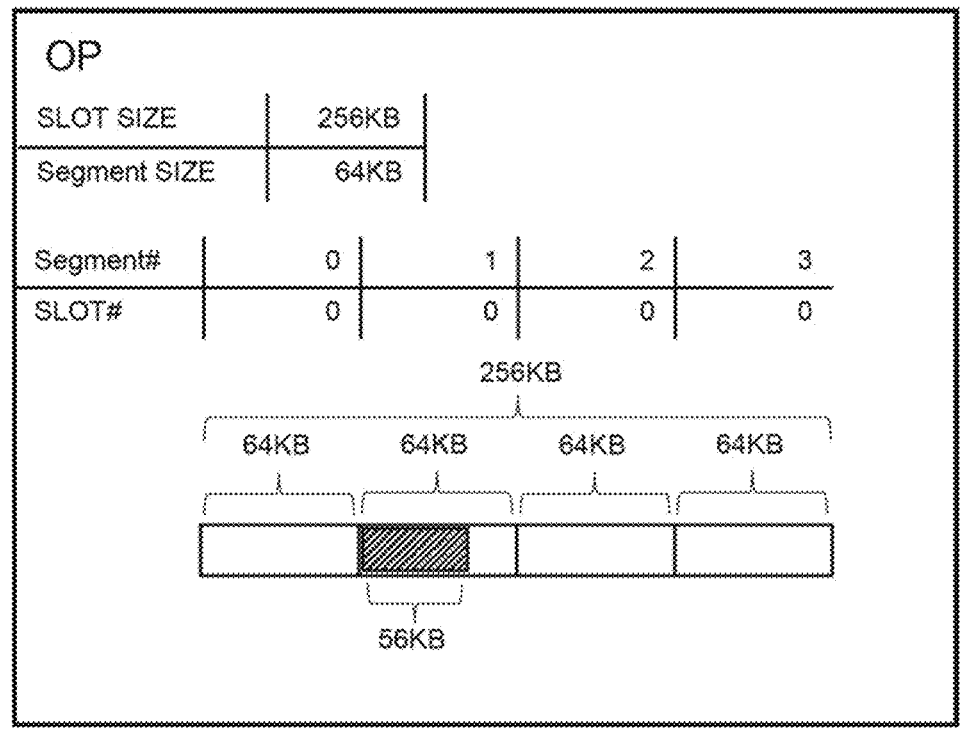

FIG. 10

☐ Segment # TABLE

R/W POSITION IN VOL #1 IS SLOT #1

| VOL # | R/W POSITION SLOT # | Segment # |
|---|---|---|
| 1 | 1 | - |

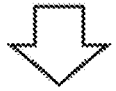

SINCE VOL #1 TO BE SUBJECT TO R/W IS OF MF ATTRIBUTE BASED ON OP/MF ATTRIBUTE TABLE, SLOT #1 IS Segment #1

| VOL # | R/W POSITION SLOT # | Segment # |
|---|---|---|
| 1 | 1 | 1 |

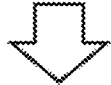

Parity Group WITH WHICH VOL #1 IS AFFILIATED IS Parity Group #1 BASED ON OP/MF ATTRIBUTE TABLE. MOREOVER, VOL OF EXTERNAL CONNECTION DESTINATION IS VOL #3 HAVING SAME Parity Group #1 BASED ON OP/MF ATTRIBUTE TABLE.

| VOL # | R/W POSITION SLOT # | Segment # |
|---|---|---|
| 3 | - | 1 |

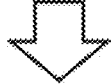

SINCE VOL #3 IS OF OP ATTRIBUTE BASED ON OP/MF ATTRIBUTE TABLE, Segment #1 IS SLOT #0. IN OTHER WORDS, R/W POSITION SLOT # IN EXTERNAL CONNECTION DESTINATION VOL #3 IS SLOT #0.

| VOL # | R/W POSITION SLOT # | Segment # |
|---|---|---|
| 3 | 0 | 1 |

STORAGE SYSTEM AND DATA PROCESSING METHOD

TECHNICAL FIELD

The present invention relates to a storage system and a data processing method.

BACKGROUND ART

Conventionally, there is the technology described in Japanese Unexamined Patent Application Publication (Translation of PCT Application) No. 2014-507693 (PTL 1) regarding the data processing of a storage system. This Publication provides the following description: "A storage system includes a memory area, a cache memory area, and a processor. The memory area stores temporal relation information indicating a temporal relationship of a data element, which is stored in the cache memory area and is to be written in a logical area, and time of snapshot acquisition performed to a main volume. The processor determines whether the data element of the cache memory area is a snapshot constituent element based on the temporal relation information regarding the data element of the cache memory area to be written in the logical area of a write destination pursuant to a write request designating the main volume. When the processor obtains a positive determination result, the processor saves the data element in a sub volume for retaining a snapshot image having the snapshot constituent element as its constituent element, and thereafter stores the data element to be written in the cache memory area."

CITATION LIST

Patent Literature

[PTL 1] Japanese Unexamined Patent Application Publication (Translation of PCT Application) No. 2014-507693

SUMMARY OF THE INVENTION

Problems to be Solved by the Invention

According to PTL 1, the high functionality of data processing of snapshots and the like can be realized. Nevertheless, this kind of function needs to be developed for each system environment. Thus, for instance, there will be differences in the function depending on the environment, such as being able to retain a snapshot only up to 16 generations in a mainframe environment, but being able to retain a snapshot up to 1024 generations in an open environment, and the burden of cost and labor will be considerable in order to develop a function, which is equivalent to the function of an open environment, once again in a mainframe environment.

Thus, an object of the present invention is to expand the functions of a mainframe environment by leveraging the functions of an open environment.

Means to Solve the Problems

In order to achieve the foregoing object, one representative storage system and data processing method of the present invention is a storage system in which a second storage of an open system is externally connected to a first storage of a mainframe system, wherein: the second storage comprises a second main volume of an open environment generated in association with a main logical device of the second storage, and a second sub volume of an open environment generated in association with a sub logical device of the second storage; the first storage comprises a first main volume of a mainframe environment generated in association with the main logical device of the second storage, and a first sub volume of a mainframe environment generated in association with the sub logical device of the second storage; when the first storage receives a data processing request from a host, the first storage reflects the processing request in the second storage and thereby completes the processing; and when the first storage receives an execution request of a prescribed function, the first storage causes the second storage to execute the function.

Advantageous Effects of the Invention

According to the present invention, the functions of a mainframe environment can be expanded by leveraging the functions of an open environment. Other objects, configurations and effects will become apparent based on the explanation of the following embodiments.

BRIEF DESCRIPTION OF DRAWINGS

FIG. 8 is an explanatory diagram of the environment attribute table.
FIG. 9 is an explanatory diagram on compensating the difference in the data length due to the environment.
FIG. 10 is a specific example of conversion based on the Segment.

DESCRIPTION OF EMBODIMENTS

Embodiments of the present invention are now explained with reference to the appended drawings.

Embodiments

Figure 1:
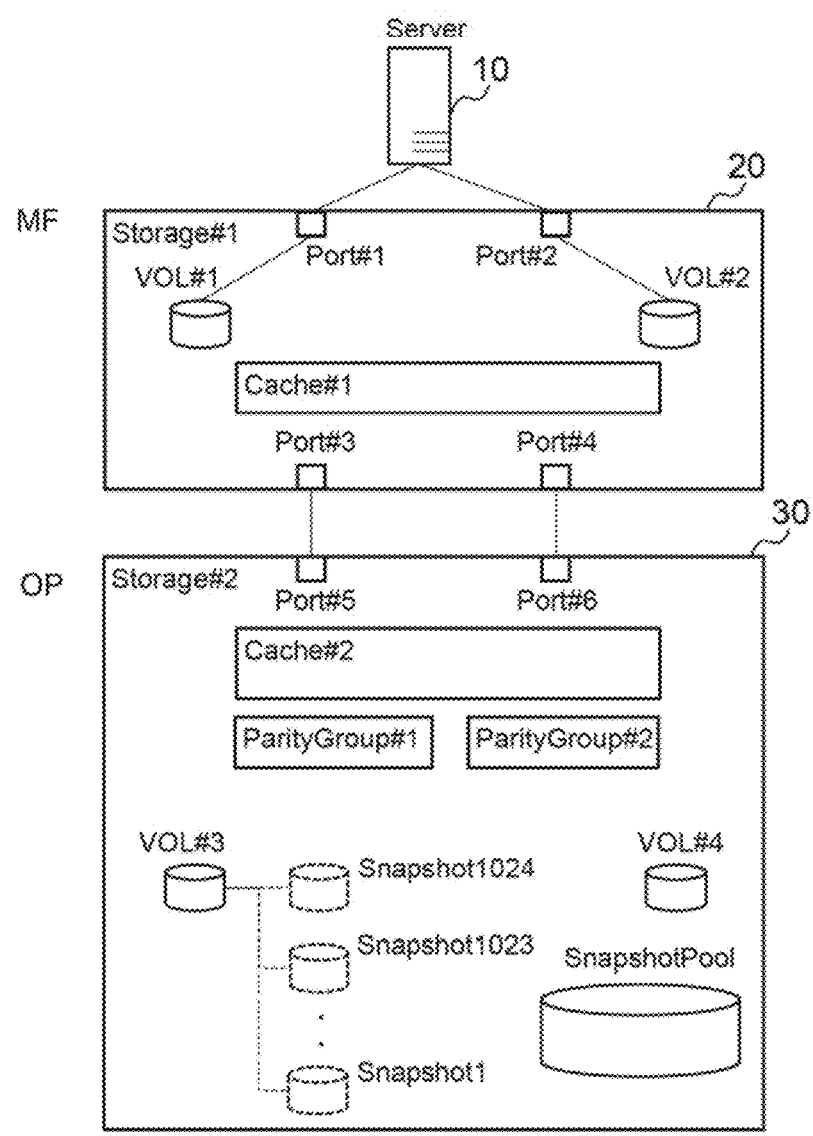
FIG. 1 is a configuration diagram of the storage system.

FIG. 1 is a configuration diagram of the storage system. With the storage system shown in FIG. 1, a server 10 as a host is connected to a storage 20, and a storage 30 is externally connected to the storage 20. The storage 20 is a first storage (Storage #1) of a mainframe (MF) system. The storage 30 is a second storage (Storage #2) of an open (OP) system.

The storage 20 uses Port No. 1 (Port #1) and Port No. 2 (Port #2) for communicating with the server 10, and uses Port No. 3 (Port #3) and Port No. 4 (Port #4) for communicating with the storage 30. The storage 30 comprises Port No. 5 (Port #5) and Port No. 6 (Port #6), and Port No. 5 is connected to Port No. 3 of the storage 20 and Port No. 6 is connected to Port No. 4 of the storage 20, respectively.

The storage 30 includes Parity Group #1 as a main logical device and Parity Group #2 as a sub logical device. Moreover, the storage 30 comprises a second main volume (VOL #3) of an open environment generated in association with the main logical device (Parity Group #1) of the storage 30, and a second sub volume (VOL #4) of an open environment generated in association with the sub logical device (Parity Group #2) of the storage 30.

The storage 20 comprises a first main volume (VOL #1) of a mainframe environment generated in association with the main logical device (Parity Group #1) of the storage 30, and a first sub volume (VOL #2) of a mainframe environment generated in association with the sub logical device (Parity Group #2) of the second storage.

When the storage 20 receives a data processing request from the server 10, the storage 20 reflects the processing request in the storage 30 and thereby completes the processing. Moreover, when the storage 20 receives an execution request of a prescribed function (for example, snapshot), the storage 20 causes the storage 30 to execute the function.

The storage 30 performs generation management with VOL #3 and, by using the Snapshot Pool, for example, can retain a snapshot up to 1024 generations. When the storage 20 receives an execution request of the snapshot function, the storage 20 requests snapshot acquisition to the storage 30 via VOL #1. When the storage 30 receives the snapshot acquisition request from the storage 20, the storage 30 maps the designated snapshot data to VOL #3, and provides the snapshot data via VOL #2 of the storage 20 associated with VOL #4. Note that the storage 20 comprises a cache memory (Cache #1) and the storage 30 comprises cache memory (Cache #2), and these cache memories are used as appropriate when processing data.

Figure 2:
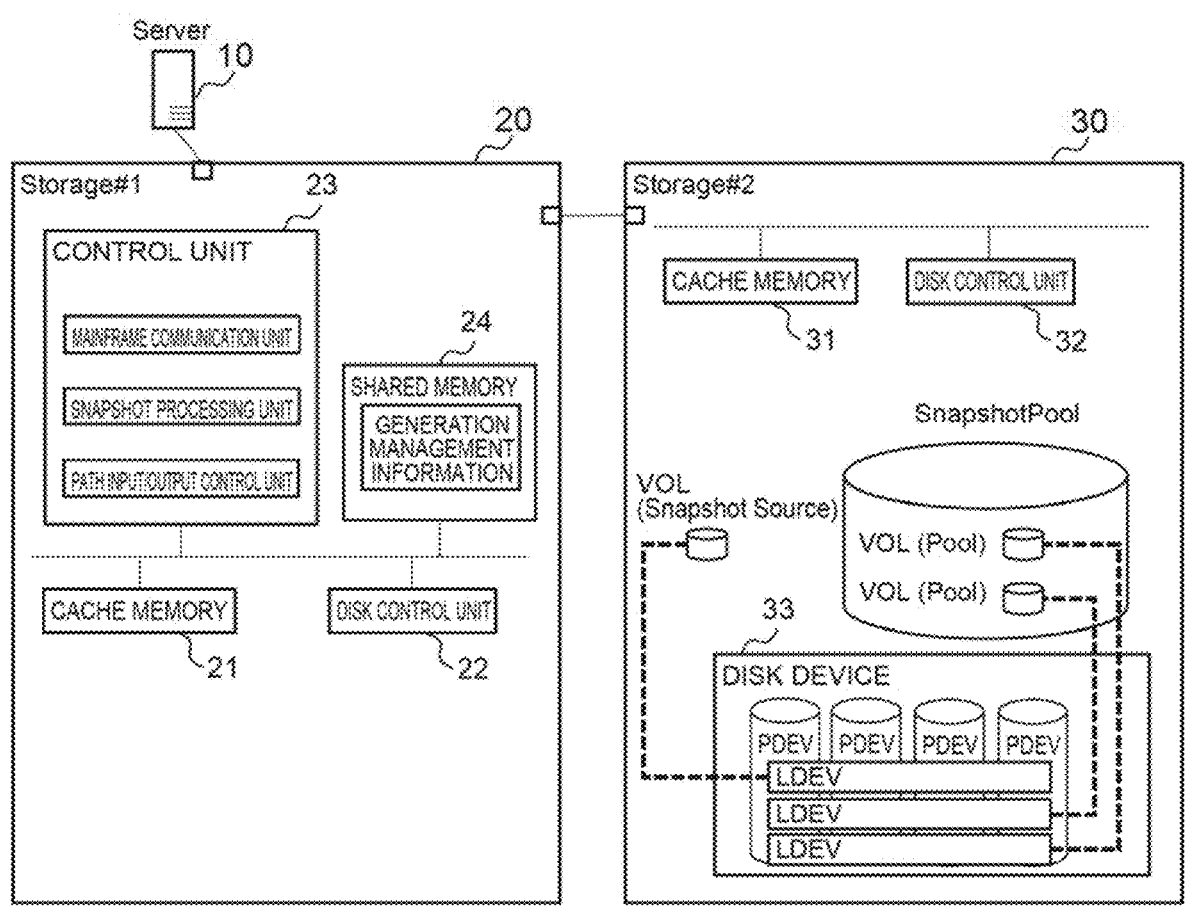
FIG. 2 is a functional block diagram of the storage system.

FIG. 2 is a functional block diagram of the storage system. As shown in FIG. 2, the storage 20 includes a cache memory 21, a disk control unit 22, a control unit 23 and a shared memory 24. The control unit 23 is a CPU (Central Processing Unit) or the like, and realizes various functions such as a mainframe communication unit, a snapshot processing unit, and a path input/output control unit by reading prescribed programs into the memory and executing such programs. The mainframe communication unit is a processing unit which performs communication with the server 10. The snapshot processing unit, upon receiving a snapshot execution request, performs processing of causing the storage 30 to execute a snapshot. The path input/output control unit controls the input/output of the storage 20 and the storage 30. The shared memory 24 is used for storing information for managing snapshot generations.

The storage 30 includes a cache memory 31, a disk control unit 32 and a disk device 33. The disk device 33 includes a plurality of physical devices (PDEVs). The storage 30 forms a Parity Group from a plurality of PDEVs, and allocates a plurality of LDEVs, as logical devices, therefrom. In FIG. 2, a Parity Group of 3D1P is formed, one LDEV is used as Parity Group #1 with which the VOL of the snapshot source (VOL #3 of FIG. 1) is affiliated, and two LDEVs are used as Parity Group #2 with which the VOL for use as the Snapshot Pool is affiliated. A Snapshot Pool is a Pool created from a plurality of LDEVs, and is used for storing difference data when an update occurs after a snapshot is acquired.

Figure 3:
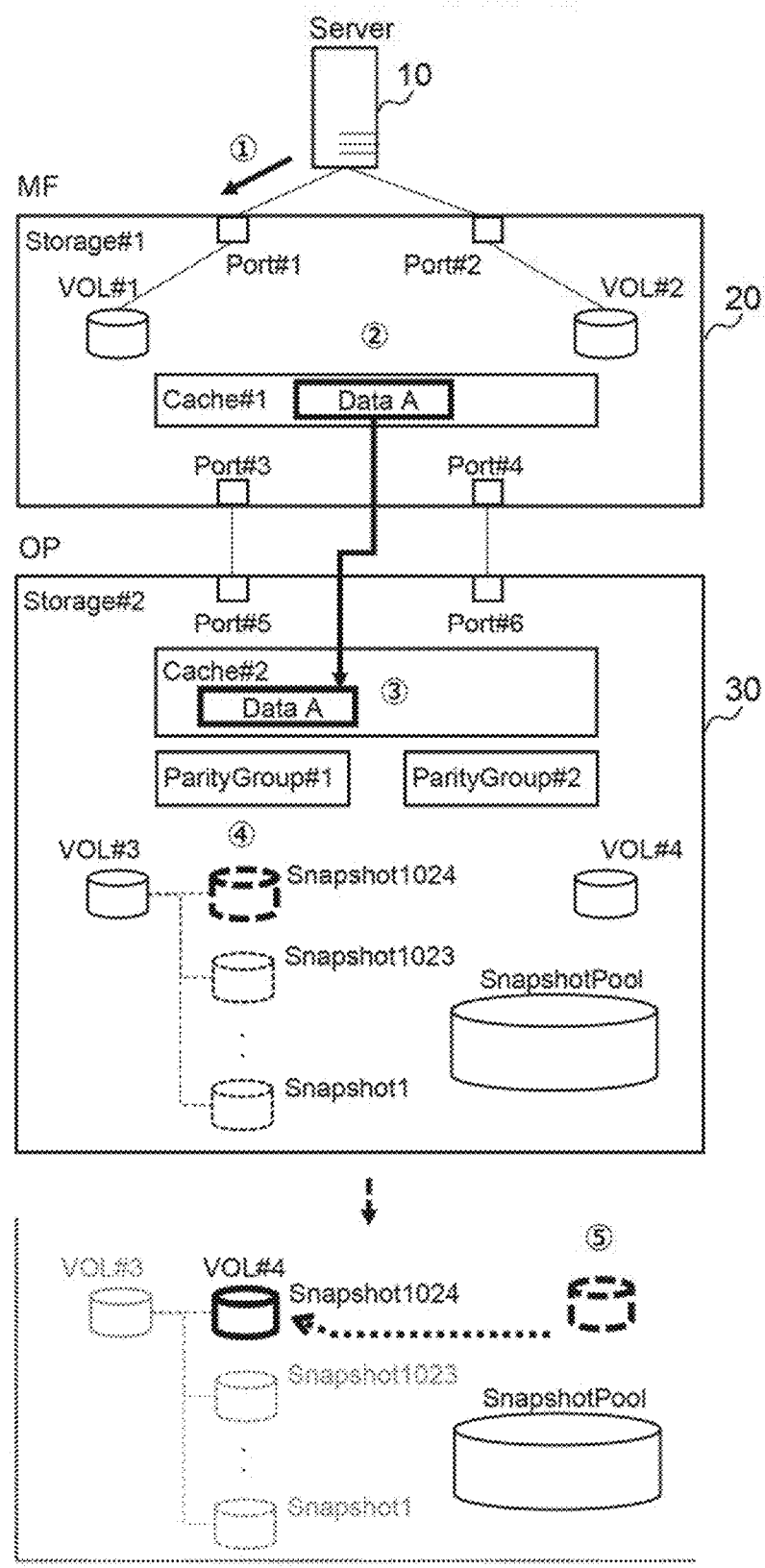
FIG. 3 is an explanatory diagram of the normal write processing performed in the storage system.
Figure 4:
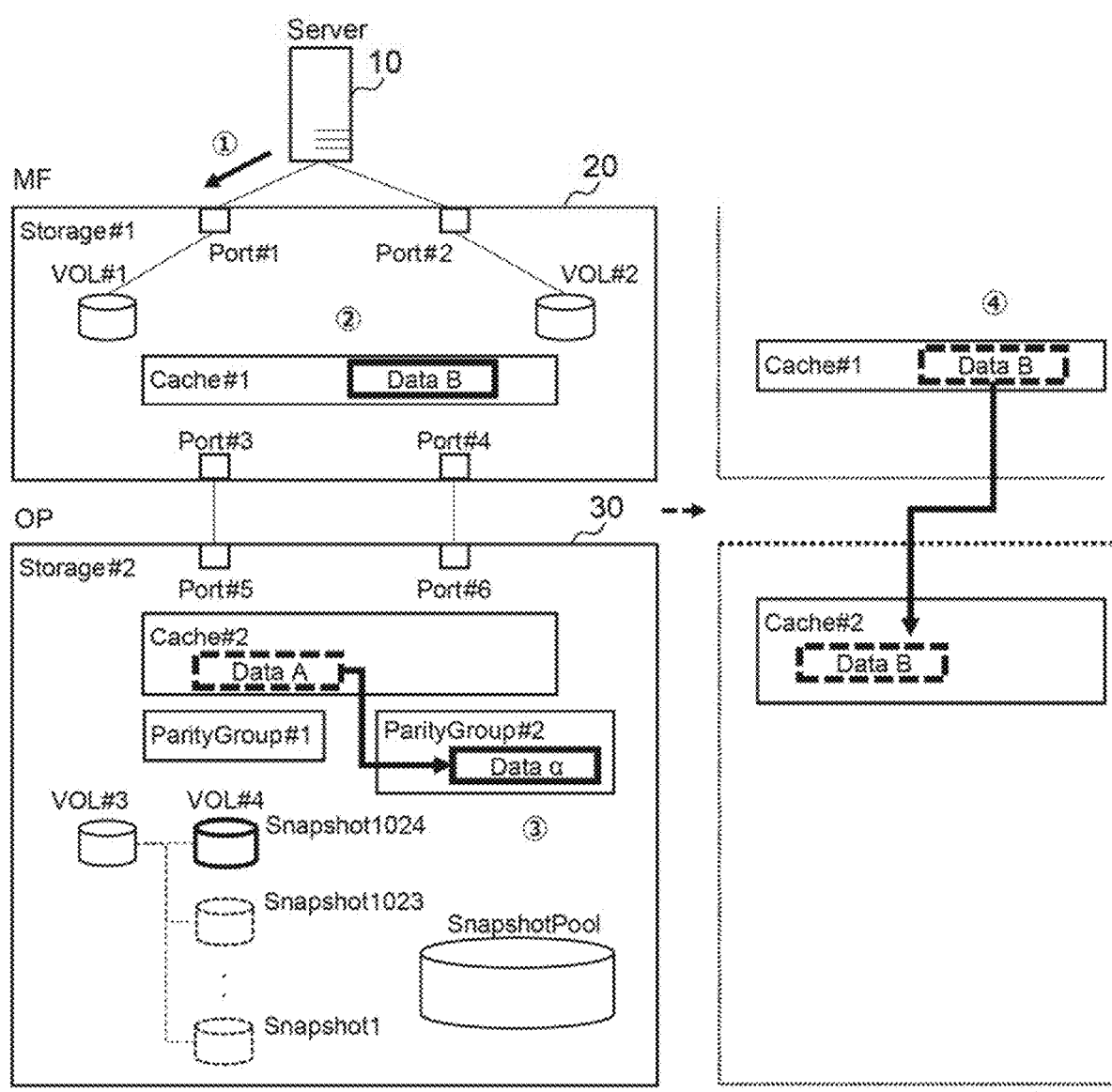
FIG. 4 is an explanatory diagram of the update write processing performed in the storage system.
Figure 13:
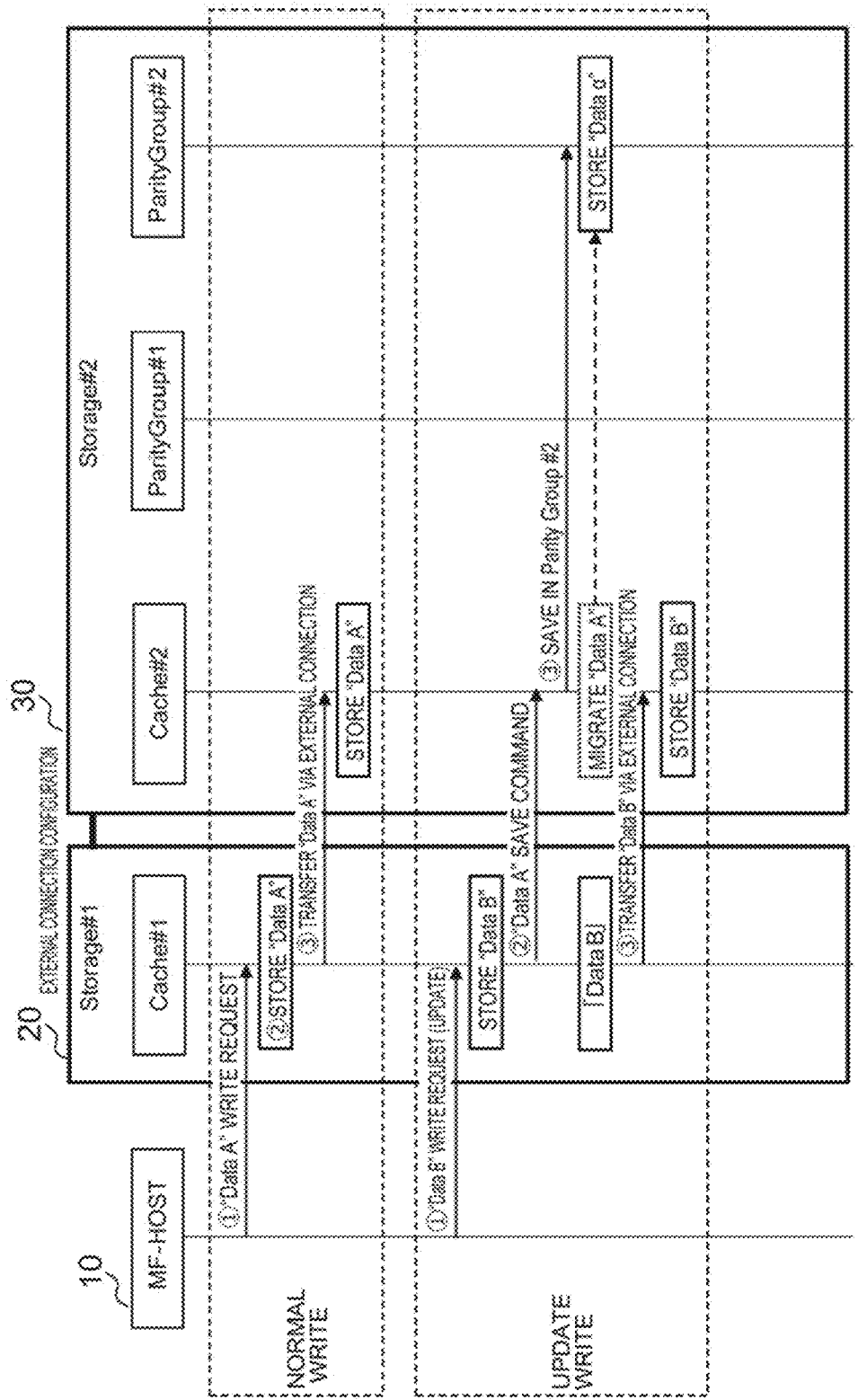
FIG. 13 is a sequence diagram explaining the operation of write processing.

Operation of the write processing of the storage system is now explained. FIG. 3 is an explanatory diagram of the normal write processing performed in the storage system. FIG. 4 is an explanatory diagram of the update write processing performed in the storage system. Moreover, FIG. 13 is a sequence diagram explaining the operation of write processing. Here, the explanation will be provided mainly with reference to FIG. 3 and FIG. 4. In FIG. 3, foremost, the server 10 is issuing a write processing command Write (A) of Data A to VOL #1 of the storage 20, which is a mainframe (MF) system.

The storage 20 receives Write (A), and stores the Data A in Cache #1 (2). The storage 20 thereafter transfers the Data A to, and stores the Data A in, Cache #2 of the storage 30 (3). This data transfer is performed by going through Port #3 to Port #5. Once the data transfer to Cache #2 of the storage 30 is complete, the storage 20 sends a reply of write complete to the server 10.

Moreover, in FIG. 3, the storage 20 is instructing the acquisition of a snapshot from VOL #3 of the storage 30, which is an open (OP) system. Thus, the storage 30 uses the function of an open environment and acquires the latest snapshot (Snapshot 1024) (4), and maps the Snapshot 1024 to VOL #4 (5).

In FIG. 4, the server 10 is issuing a write processing command Write (B) of Data B to the position where Write (A) was issued in the MFVOL (VOL #1) of the storage 20 (1).

The storage 20 receives Write (B), and stores the Data B in Cache #1 (2). While the storage 20 thereafter transfers the Data B to, and stores the Data B in, Cache #2 by going through Port #3 to Port #5, here, if the storage 30 has not yet saved the Data A in the Snapshot 1024, the storage 30 saves the Data A in the Snapshot 1024, When saving the Data A, the Data A itself is stored in Parity Group #2 with which the Snapshot Pool is affiliated (3). If the Data A has already been saved, the Data A is overwritten with the Data B. After the foregoing saving process, the storage 20 transfers the Data B to, and stores the Data B in, Cache #2 of the storage 30 (4) and, once the data transfer is complete, sends a reply of write complete to the server 10.

Figure 5:
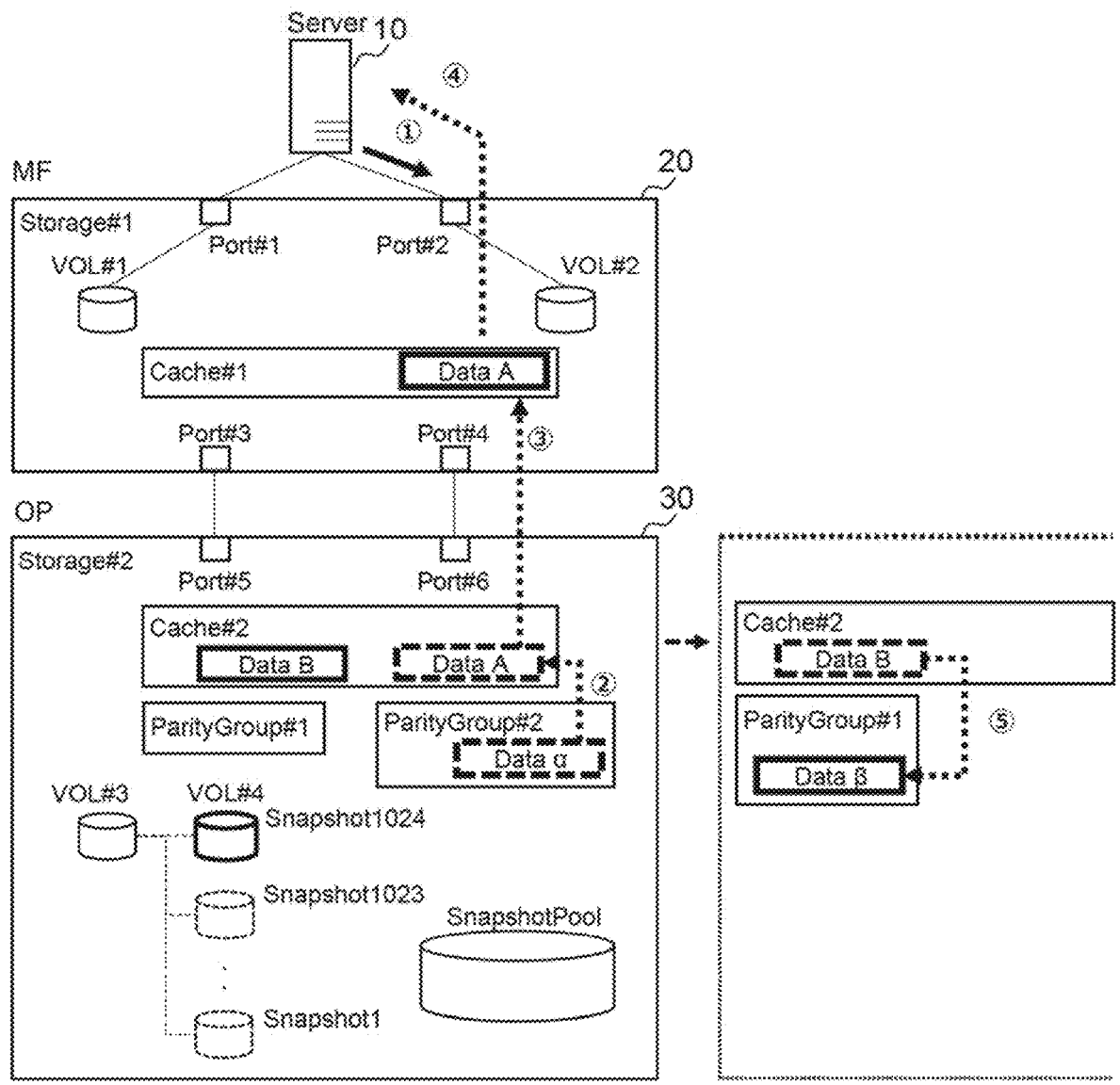
FIG. 5 is an explanatory diagram of the read processing performed in the storage system.
Figure 14:
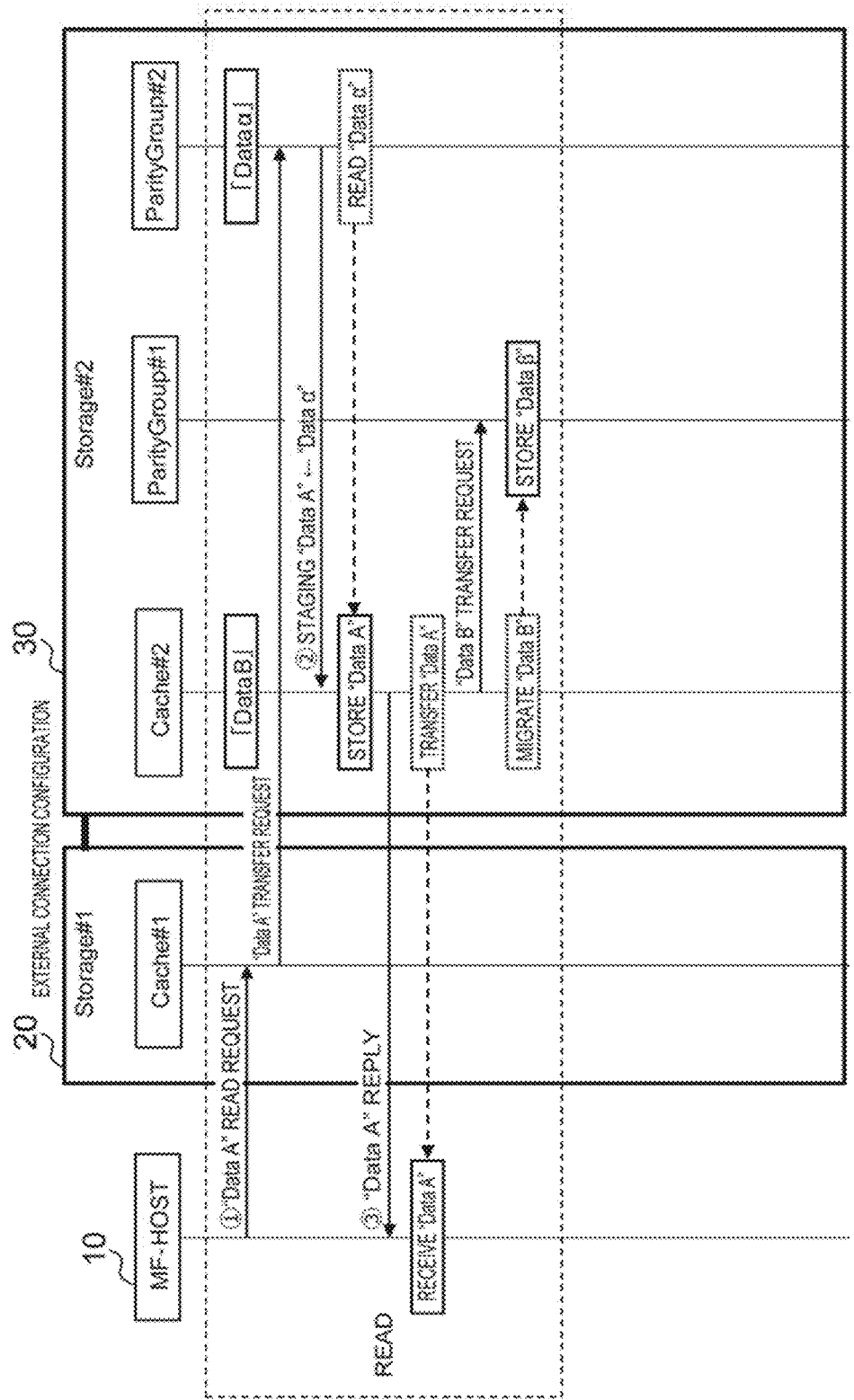
FIG. 14 is a sequence diagram explaining the operation of read processing.

FIG. 5 is an explanatory diagram of the read processing performed in the storage system. Moreover, FIG. 14 is a sequence diagram explaining the operation of read processing, Here, the explanation will be provided mainly with reference to FIG. 5. In FIG. 5, the server 10 is issuing a read processing command Read to the MFVOL (VOL #2) of the storage 20 in a state where the update write processing of FIG. 4 is complete (1). The storage 30 stages the Data A from Parity Group #2 to Cache #2, and stores the Data A in Cache #2 (2). The storage 30 thereafter transfers the Data A to, and stores the Data A in, Cache #1 of the storage 20 by going through Port #6 and Port #4 (3). The storage 20 transfers the Data A stored in Cache #1 to the server 10 (4). Moreover, the storage 30 stores the Data B in Parity Group #1 with which VOL #3 is affiliated (5).

The setting of the storage system is now explained. As the setting of the storage system, the setting of the storage 20 of a mainframe environment is configured after the setting of the storage 30 of an open environment is configured.

Figure 6:
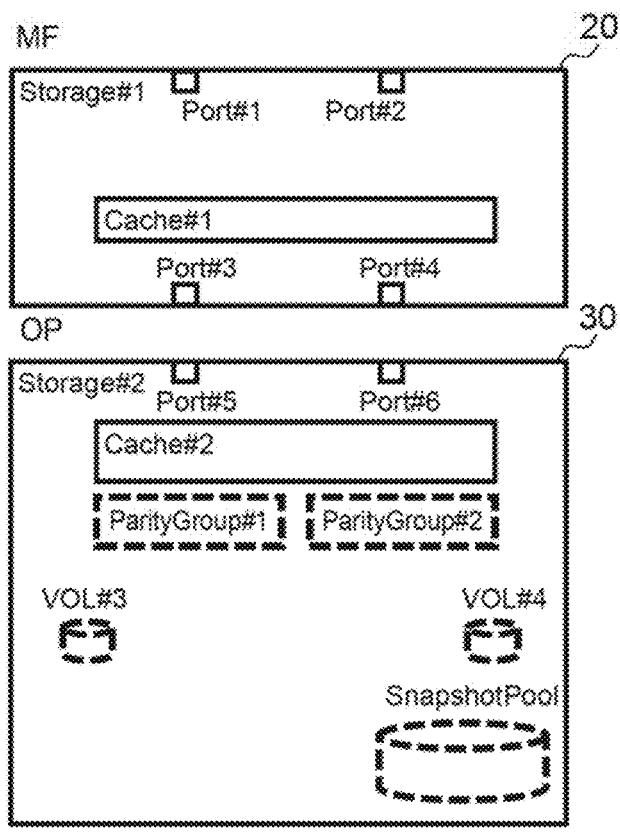
FIG. 6 is an explanatory diagram of the setting of the open system storage.

FIG. 6 is an explanatory diagram of the setting of the open system storage 30. As shown in FIG. 6, the storage 30 of an open environment foremost creates Parity Group #1 and Parity Group #2 (1). Next, the storage 30 creates VOL #3 from Parity Group #1, and creates VOL #4 from Parity Group #2 (2). Here, preferably, the volumes are created in the same size as the volumes created in the mainframe environment. The storage 30 thereafter creates the Snapshot Pool (3), and ends the setting.

Figure 7:
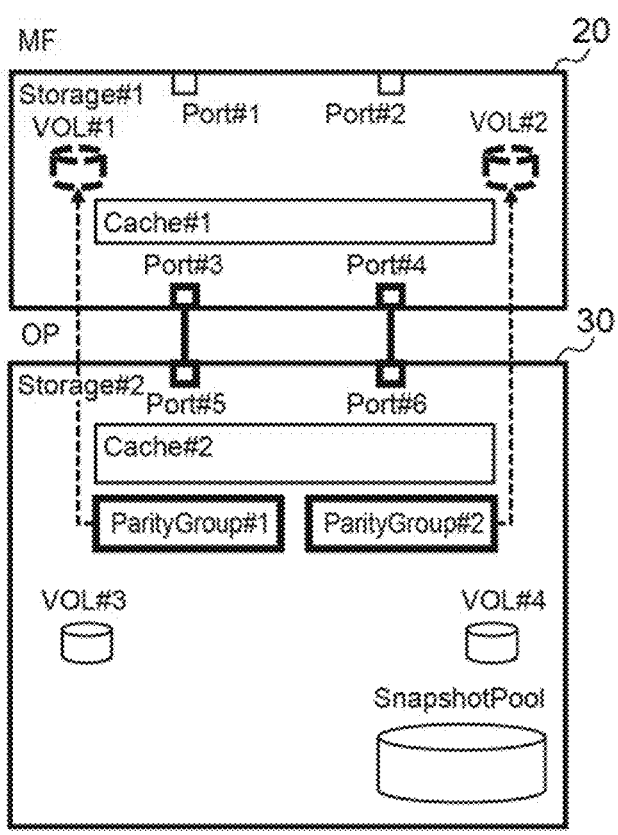
FIG. 7 is an explanatory diagram of the setting of the mainframe system storage.

FIG. 7 is an explanatory diagram of the setting of the mainframe system storage 20. As shown in FIG. 6, the storage 20 of a mainframe environment foremost connects the external connection paths (Port #3 and Port #5, Port #4 and Port #6) with the storage 30 (1). The storage 20 thereafter registers Parity Group #1 and Parity Group #2 as the external connection destinations (2). The storage 20 creates VOL #1 from Parity Group #1 registered as the external connection destination (3), additionally creates VOL #2 from Parity Group #2 registered as the external connection destination (4), and then ends the setting.

FIG. 8 is an explanatory diagram of the environment attribute table. The environment (OP/MF) attribute table is a table that is used for managing the volumes of the storage system. The environment (OP/MF) attribute table is created upon building the system (when the storage 30 is externally connected to the storage 20) and is stored, for example, in the shared memory 24 of the storage 20. Moreover, when the system configuration is changed, the environment (OP/MF) attribute table is updated to match the new system configuration. In FIG. 8, the Parity Group number and the environment attribute (OP or MF) are associated with the VOL number. Specifically, FIG. 8 shows a state where Parity Group #1 and MF are associated with VOL #1, Parity Group #2 and MF are associated with VOL #2, Parity Group #1 and OP are associated with VOL #3, and Parity Group #2 and OP are associated with VOL #4.

FIG. 9 is an explanatory diagram on compensating the difference in the data length due to the environment. In the example of FIG. 9, the SLOT size of the mainframe environment is 64 KB, and the SLOT size of the open environment is 256 KB. In order to compensate this difference in the data length, the storage system uses the "Segment" of 64 KB. The Segment size is equal to or less than the smallest SLOT size, and is preferably the common divisor of all SLOT sizes.

In the example of FIG. 9, 64 KB is adopted as the Segment size. Thus, while the SLOT and the Segment correspond one-to-one in the mainframe environment, four Segments correspond to one SLOT in the open environment. As a result of defining the Segment in the manner described above and the storage 20 and the storage 30 managing data in Segment units in the cache, the difference in the SLOT size due to the environment can be compensated, and conversion of the external connection source and the external connection destination is enabled.

FIG. 10 is a specific example of conversion based on the Segment. The Segment table shown in FIG. 10 is stored in the shared memory 24, and the storage 20 refers to the Segment table and coverts the data address when requesting processing to the storage 30. FIG. 10 shows a case where the RAN position in VOL #1 is SLOT #1. Since VOL #1 to be subject to R/W is of a MF attribute based on the OP/MF attribute table, SLOT #1 is Segment #1. Next, the Parity Group with which VOL #1 is affiliated is Parity Group #1 based on the OP/MF attribute table. Moreover, the VOL of the external connection destination is VOL #3 having the same Parity Group #1 based on the OP/MF attribute table. Furthermore, since VOL #3 is of an OP attribute based on the OP/MF attribute table, Segment #1 is SLOT #0. In other words, the RAN position SLOT # in external connection destination VOL #3 is SLOT #0.

Figure 11:
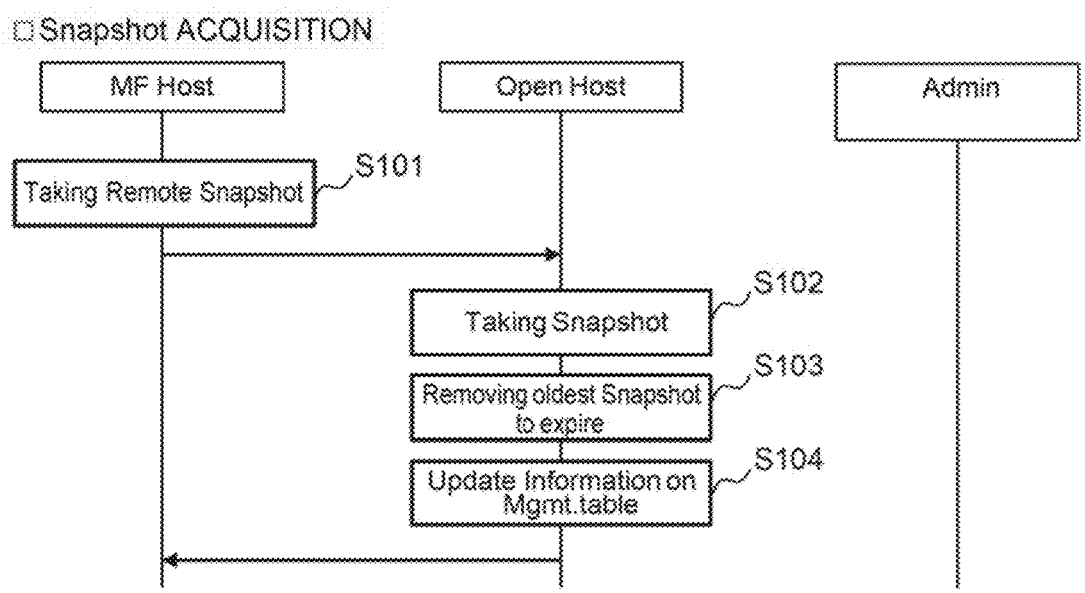
FIG. 11 is a flowchart showing the processing routine of snapshot acquisition.

FIG. 11 is a flowchart showing the processing routine of snapshot acquisition. In FIG. 11, the host (MF Host) of a mainframe environment foremost remotely executes snapshot acquisition (step S101), The host of a mainframe environment is the subject that requests snapshot acquisition in FIG. 11 and is, for example, the storage 20. Remote snapshot acquisition is, specifically, the processing of requesting the host (Open Host) of an open environment to acquire a snapshot. The host of an open environment is the subject of executing the snapshot in FIG. 11, and is the storage 30. The host of an open environment receives the request from the MF Host and acquires (takes) the snapshot (step S102), and removes the oldest snapshot (step S103). The host of an open environment thereafter updates the snapshot management table (generation management information of the shared memory 24) (step S104), and then ends the processing. The snapshot acquisition routine of FIG. 11 may be performed periodically, or may be executed by the storage 20 upon detecting the satisfaction of a prescribed condition. Moreover, the snapshot acquisition routine of FIG. 11 is also executed based on a request from the server 10 in certain cases. Note that "Admin" shown in FIG. 11 is a terminal which is connected to the storage 30 without going through the storage 20 and receives operations from the administrator. While the administrator can directly manage the storage 30 by using the Admin, this kind of direct intervention is not required for the execution of a snapshot. Meanwhile, when performing data verification, the administrator will start the processing by operating the Admin.

Figure 12:
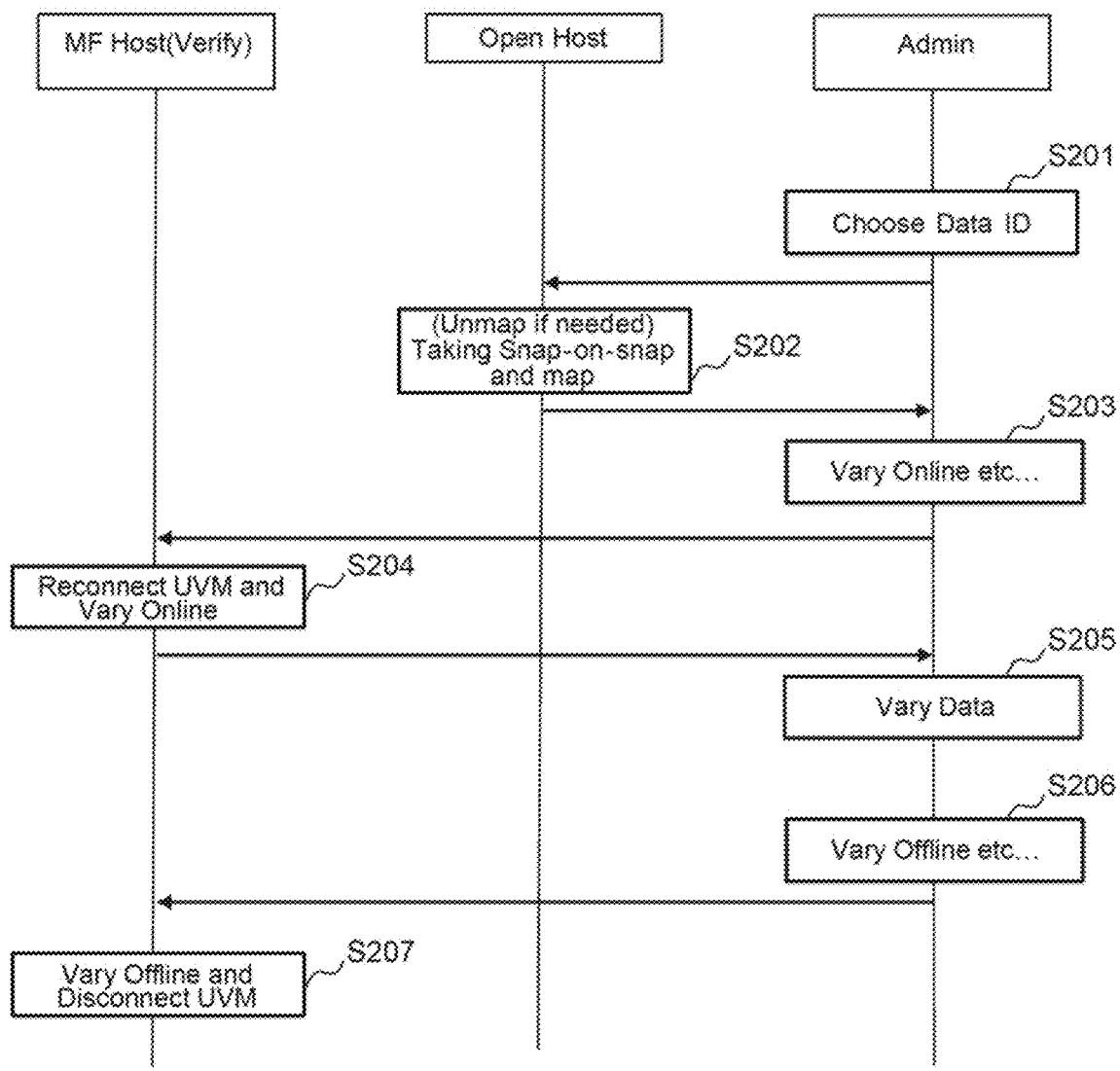
FIG. 12 is a flowchart showing the processing routine of data verification.

FIG. 12 is a flowchart showing the processing routine of data verification. In FIG. 12, the Admin terminal that received an operation from the administrator foremost chooses a data ID to be verified (step S201). The host (Open Host) of an open environment unmaps the chosen data as necessary, and acquires and maps a snap-on-snap (step S202).

Next, when the Admin terminal receives an operation for switching to online (step S203), the host (MF Host) of a mainframe environment executes the reconnection to a UVM and the switching to online (step S204), When the Admin terminal thereafter receives an operation for changing the data (step S205) and switching to offline (step S206), the host (MF Host) of a mainframe environment executes the switching to offline and disconnects from the UVM (step S207), and then ends the processing.

Modified Examples

Figure 15:
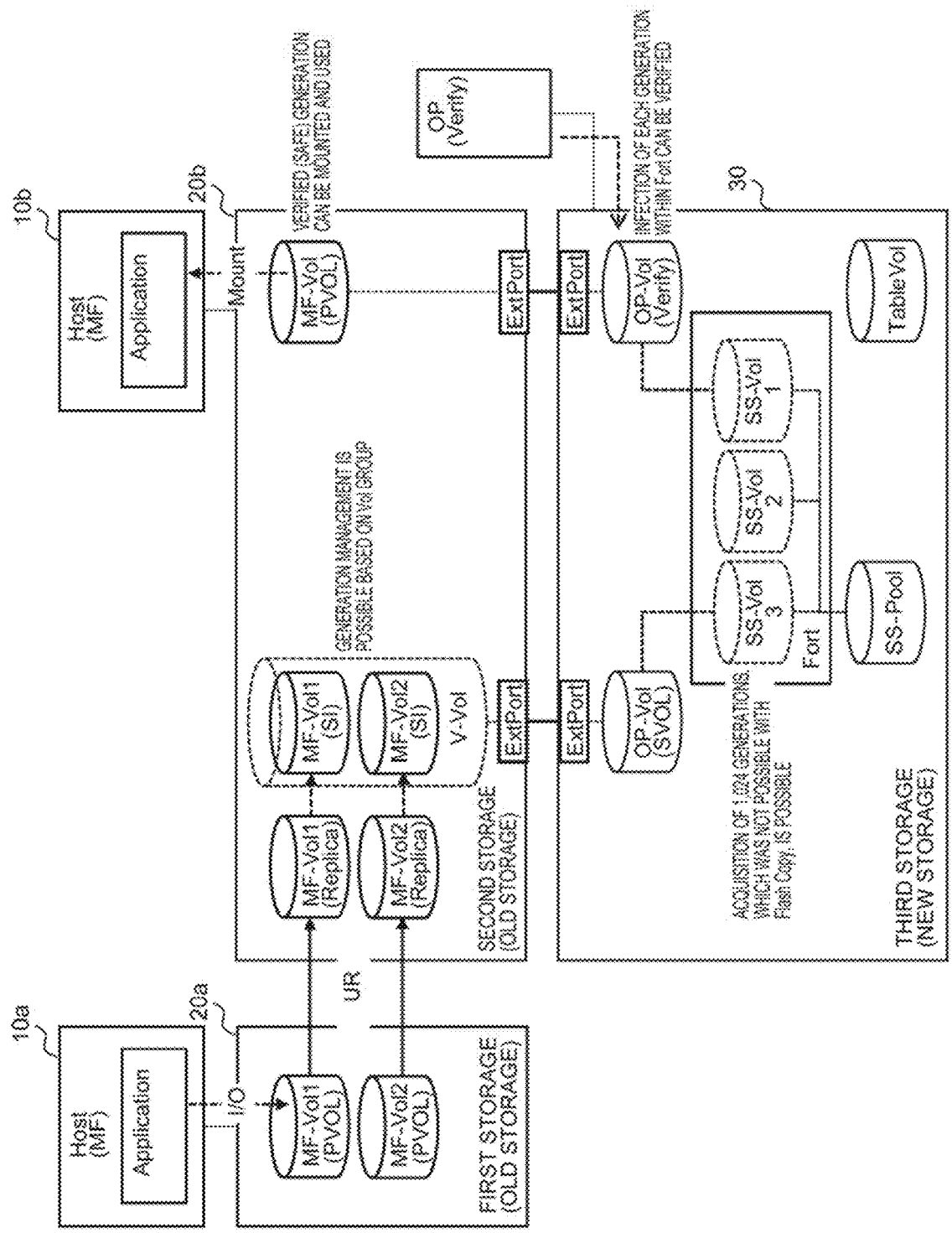
FIG. 15 is a first modified example of the storage system.

FIG. 15 is a first modified example of the storage system. In this modified example, a storage 20*a* is connected to a server 10*a*, which is a MF-HOST. The storage 20*a* is a storage of a mainframe environment, and includes a MF-Vol 1 (PVOL) and a MF-Vol 2 (PVOL). These volumes are subject to remote replication, and a MF-Vol 1 (Replica) and a MF-Vol 2 (Replica) are created in a storage 20b, which is similarly a storage of a mainframe environment. Furthermore, the storage 20b creates a MF-Vol 1 (SI) and a MF-Vol 2 (SI), which are replications within the storage 20b, with regard to the MF-Vol 1 (PVOL) and the MF-Vol 2 (PVOL), groups the MF-Vol 1 (SI) and the MF-Vol 2 (SI) as a V-Vol, and performs group-based generation management.

Moreover, the storage 30 of an open environment is externally connected to the storage 20b. The storage 30 can acquire a snapshot of the V-Vol up to 1024 generations. This snapshot is stored within the data protection area that cannot be accessed from the MF-HOST. For example, if the MF-Vol 1 (PVOL) and the MF-Vol 2 (PVOL) are infected with a computer virus, the infection of each generation in the data protection area can be verified by using a terminal OP (Verify) connected to the storage 30. Furthermore, the generation verified as being safe can be mounted on the storage 20b, and provided to the server 1013, which is a MF-HOST.

Figure 16:
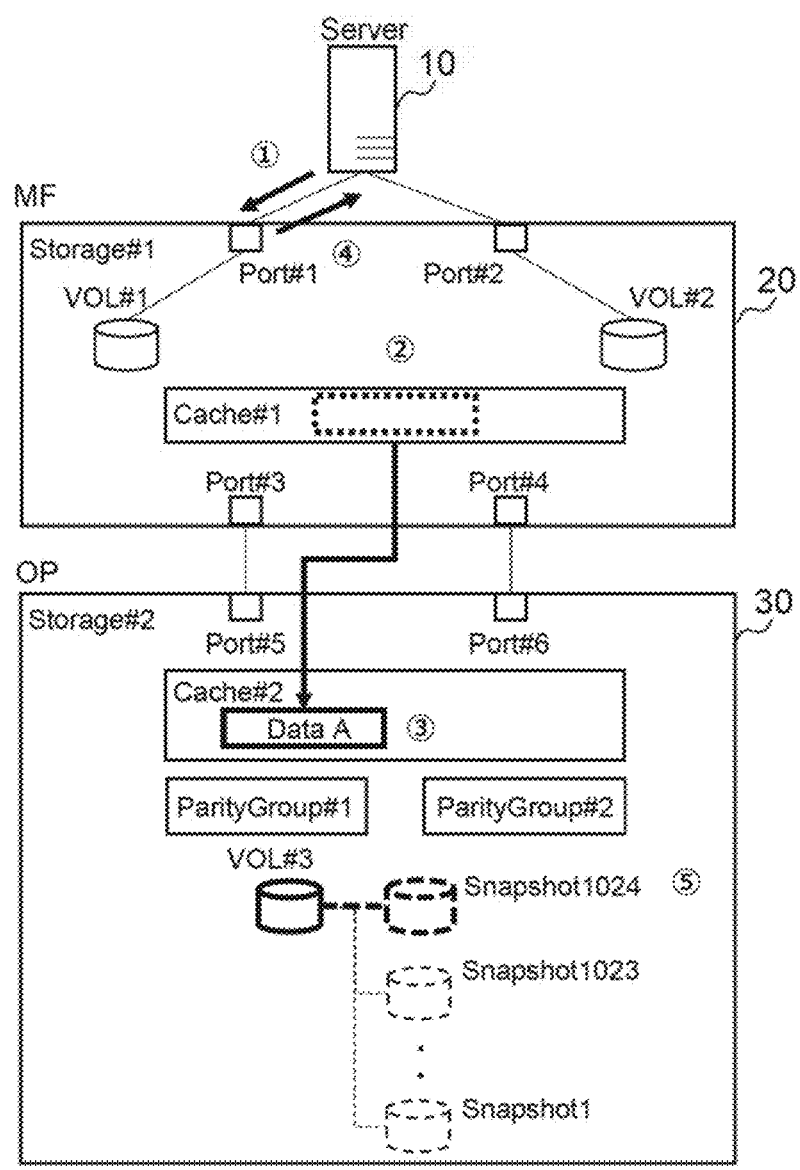
FIG. 16 is a second modified example of the storage system.

FIG. 16 is a second modified example of the storage system. In this modified example, the storage 20 of a mainframe environment does not retain a cache. For example, when the server 10 issues Write (A) to VOL #1 of the storage 20 which is a mainframe (MF) system (2), the storage 20 does not store the Data A in Cache #1 (2), directly transfers the Data A to, and stores the Data A in, Cache #2 of the storage 30 by going through Port #3 and Port #5 (3), and sends a reply of Good to the server 10. Furthermore, the storage 30, which is a mainframe (OP) system, acquires the Snapshot from VOL #3 (5). It is thereby possible to acquire the Snapshot with "Data A" reflected therein.

In this modified example, the cache of the external connection source is not used, and the cache of the external connection destination is used. Specifically, triggered by the I/O to the external connection source, writing in the cache of the external connection destination is guaranteed based on synchronization, and the external connection source sends a reply of Good to the Server. Since the storage system according to this modified example will be subject to the transfer processing overhead to the external connection destination, by directly using the cache of the external connection destination in order to reduce the total processing overhead of the Write processing, reduction of the processing overhead is realized by reducing the caching processing to the external connection source. Based on this method, disconnection before snapshot acquisition and reconnection after snapshot acquisition are no longer required.

Figure 17:
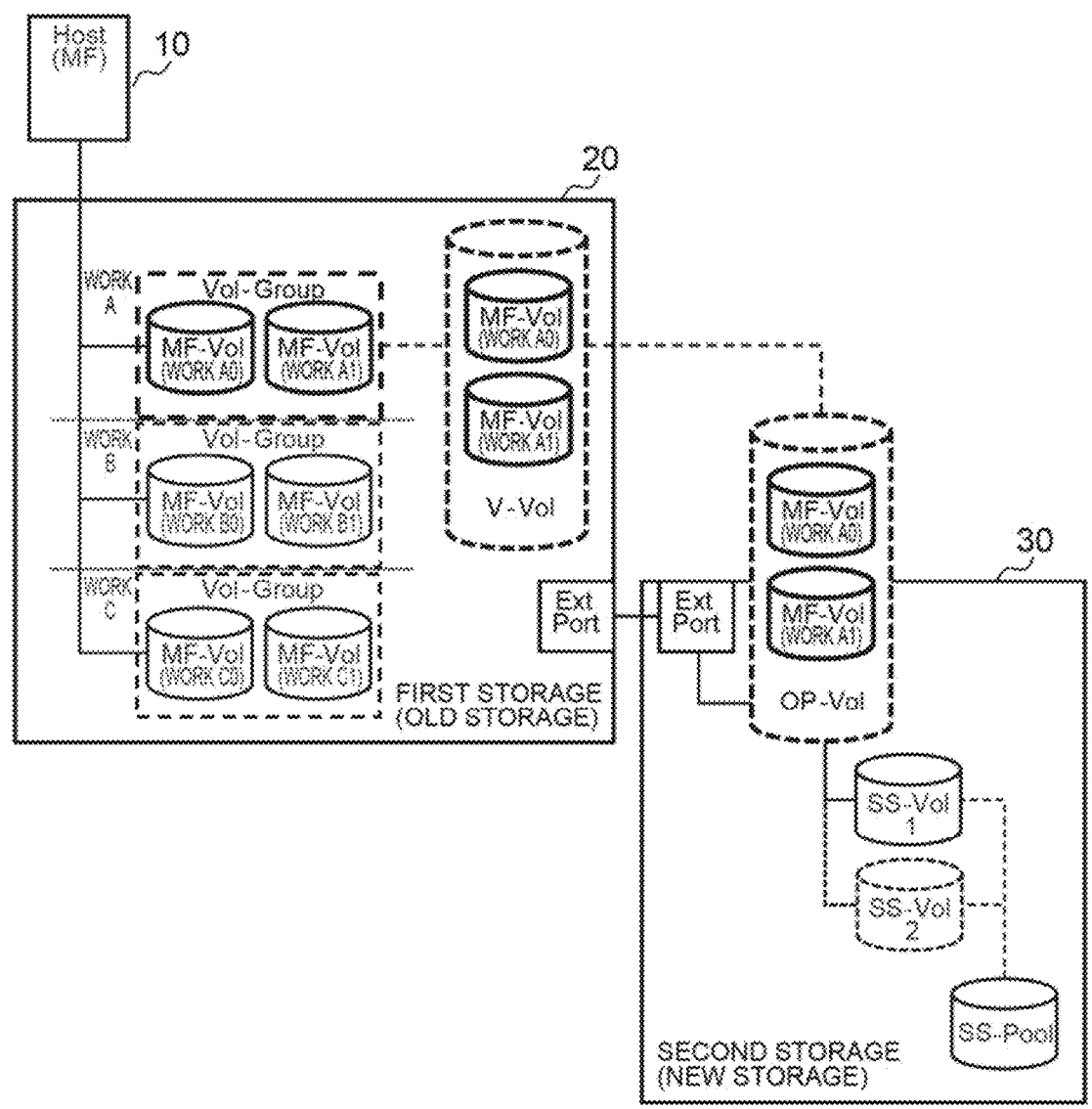
FIG. 17 is an explanatory diagram when forming a group for each usage.

A modified example of mapping a plurality of volumes of a MF and a single externally connected volume is now explained. A storage system can group a plurality of volumes of a MF, which were selected based on an arbitrary standard, and acquire a snapshot of and map the group in an externally connected OP volume, FIG. 17 is an explanatory diagram when forming a group for each usage. The usage is, for example, work or the like. In FIG. 17, the storage 20 of a mainframe environment has formed a Vol-Group including a plurality of volumes for each of work A, work B, and work C. Furthermore, the storage 30 of an open environment externally connected to the storage 20 acquires and manages, for example, a snapshot of the Vol-Group of work A.

Figure 18:
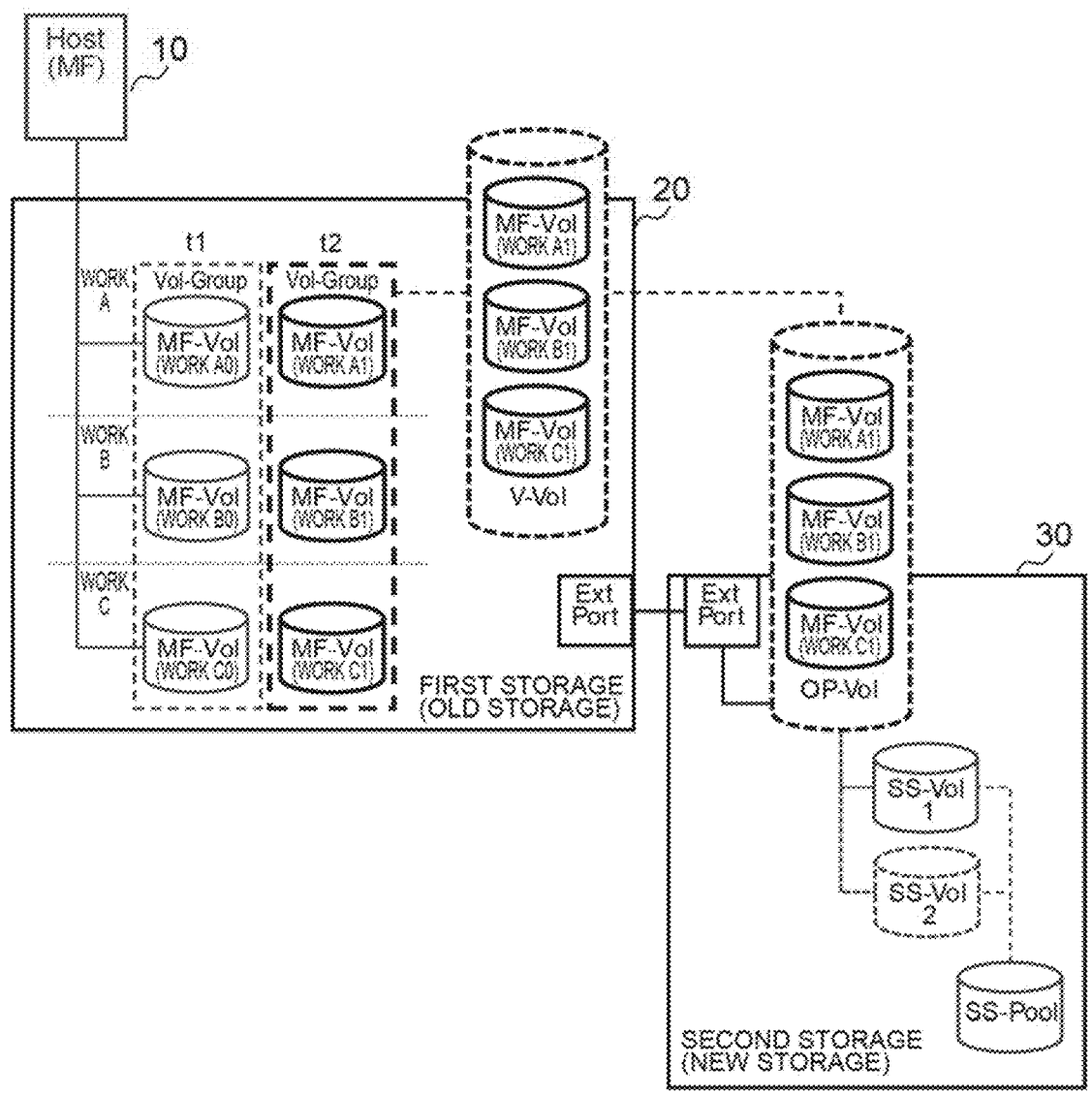
FIG. 18 is an explanatory diagram when forming a group in chronological order.

FIG. 18 is an explanatory diagram when forming a group in chronological order. In FIG. 18, the storage 20 of a mainframe environment has formed a Vol-Group including a plurality of volumes for each of time t1 and time t2. Furthermore, the storage 30 of an open environment externally connected to the storage 20 acquires and manages, for example, a snapshot of the Vol-Group at time t2.

Figure 19:
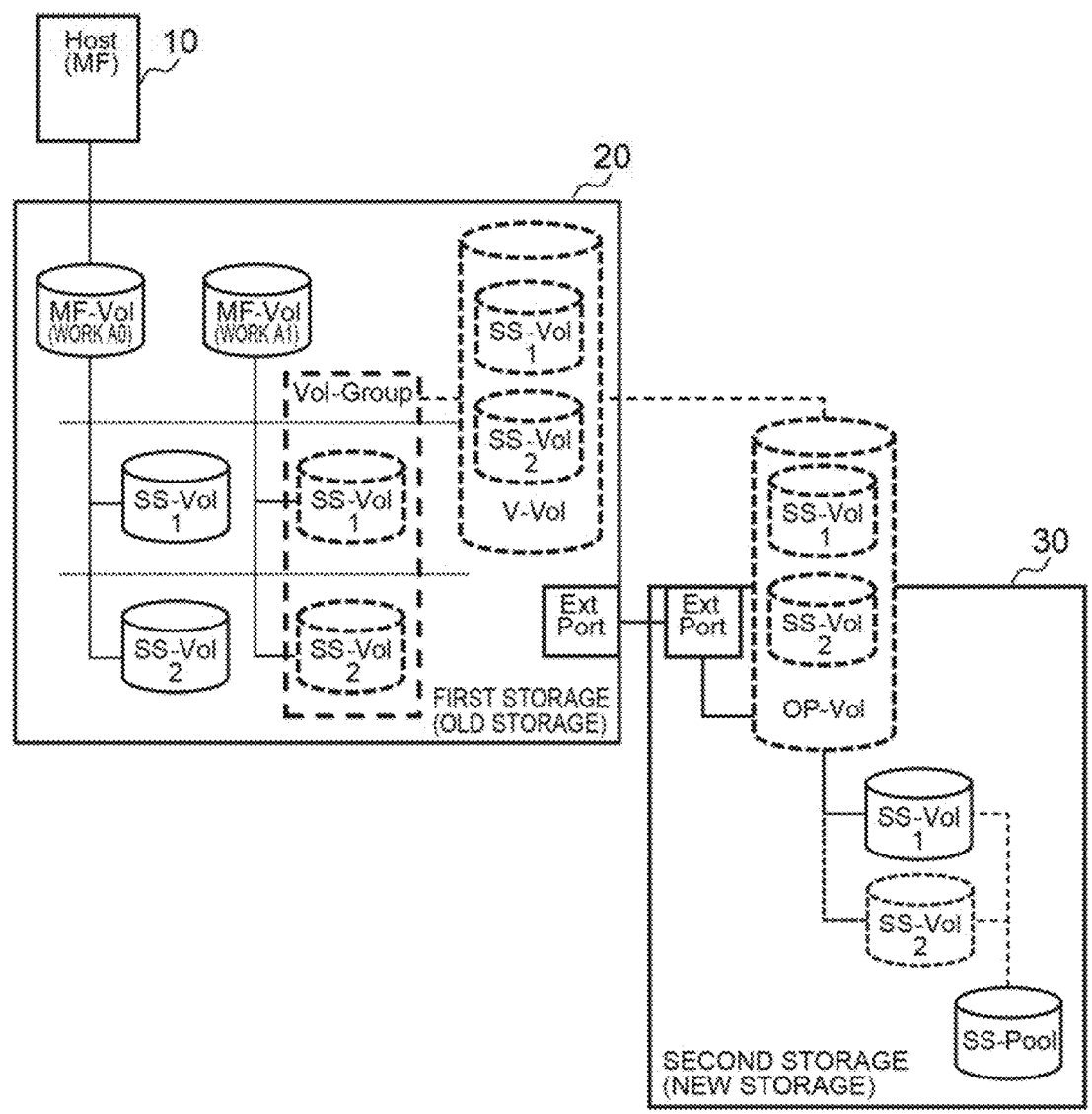
FIG. 19 is an explanatory diagram when forming a group based on local snapshot.

FIG. 19 is an explanatory diagram when forming a group based on local snapshot. In FIG. 19, the storage 20 of a mainframe environment comprises a volume of work A0 and a volume of work A1, and has acquired a snapshot of each volume as appropriate. Furthermore, the storage 20 of a mainframe environment has formed a Vol-Group including volumes of the snapshot acquired from the same volume. The storage 30 of an open environment externally connected to the storage 20 acquires and manages, for example, a snapshot of the Vol-Group of the snapshot acquired regarding the volume of work A1.

Figure 20:
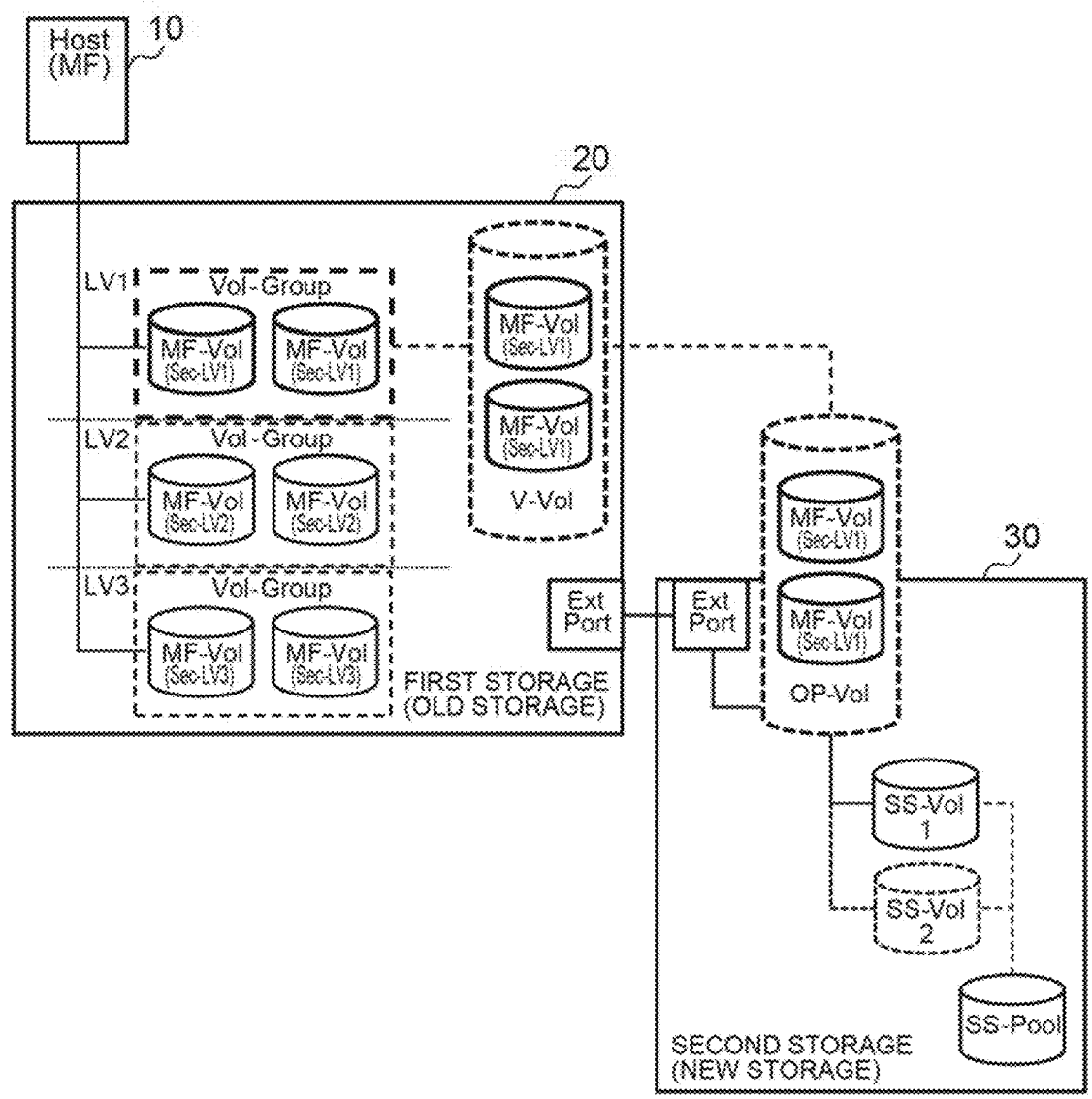
FIG. 20 is an explanatory diagram when forming a group based on security.

FIG. 20 is an explanatory diagram when forming a group based on security. In FIG. 20, grouping is performed based on differences in security level and security software. Specifically, the storage 20 of a mainframe environment has formed a Vol-Group including a plurality of volumes for each of security levels 1 to 3. Furthermore, the storage 30 of an open environment externally connected to the storage 20 acquires and manages, for example, a snapshot of the Vol-Group of security level 1.

Figure 21:
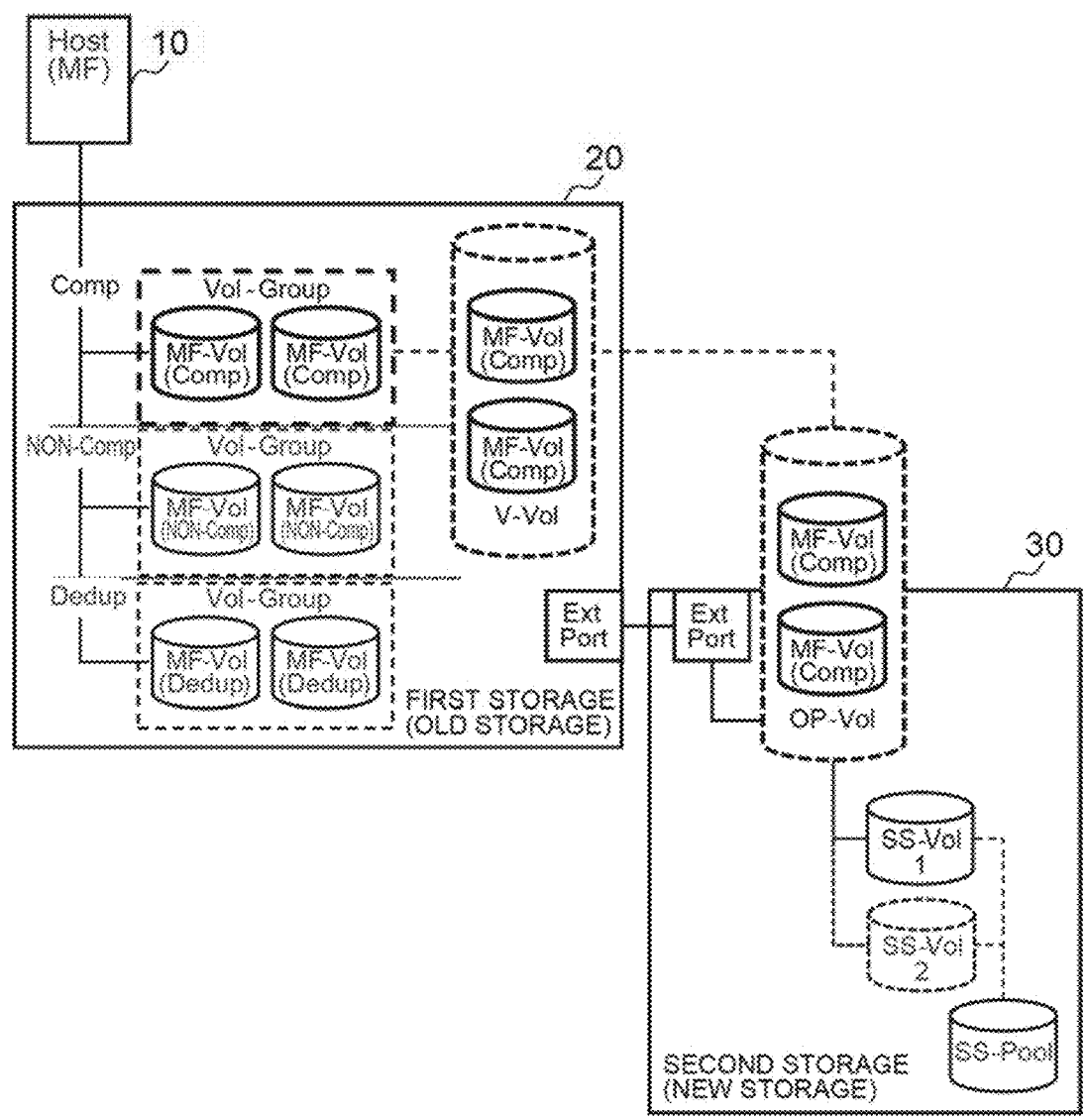
FIG. 21 is an explanatory diagram when forming a group for each Comp/Dedup setting.

FIG. 21 is an explanatory diagram when forming a group for each Comp/Dedup (Compression/Deduplication) setting. In FIG. 21, the storage 20 of a mainframe environment has formed a Vol-Group including volumes set to "Comp", a Vol-Group including volumes set to "Non-Comp", and a Vol-Group including volumes set to "Dedup". Furthermore, the storage 30 of an open environment externally connected to the storage 20 acquires and manages, for example, a snapshot of the Vol-Group of "Comp".

Figure 22:
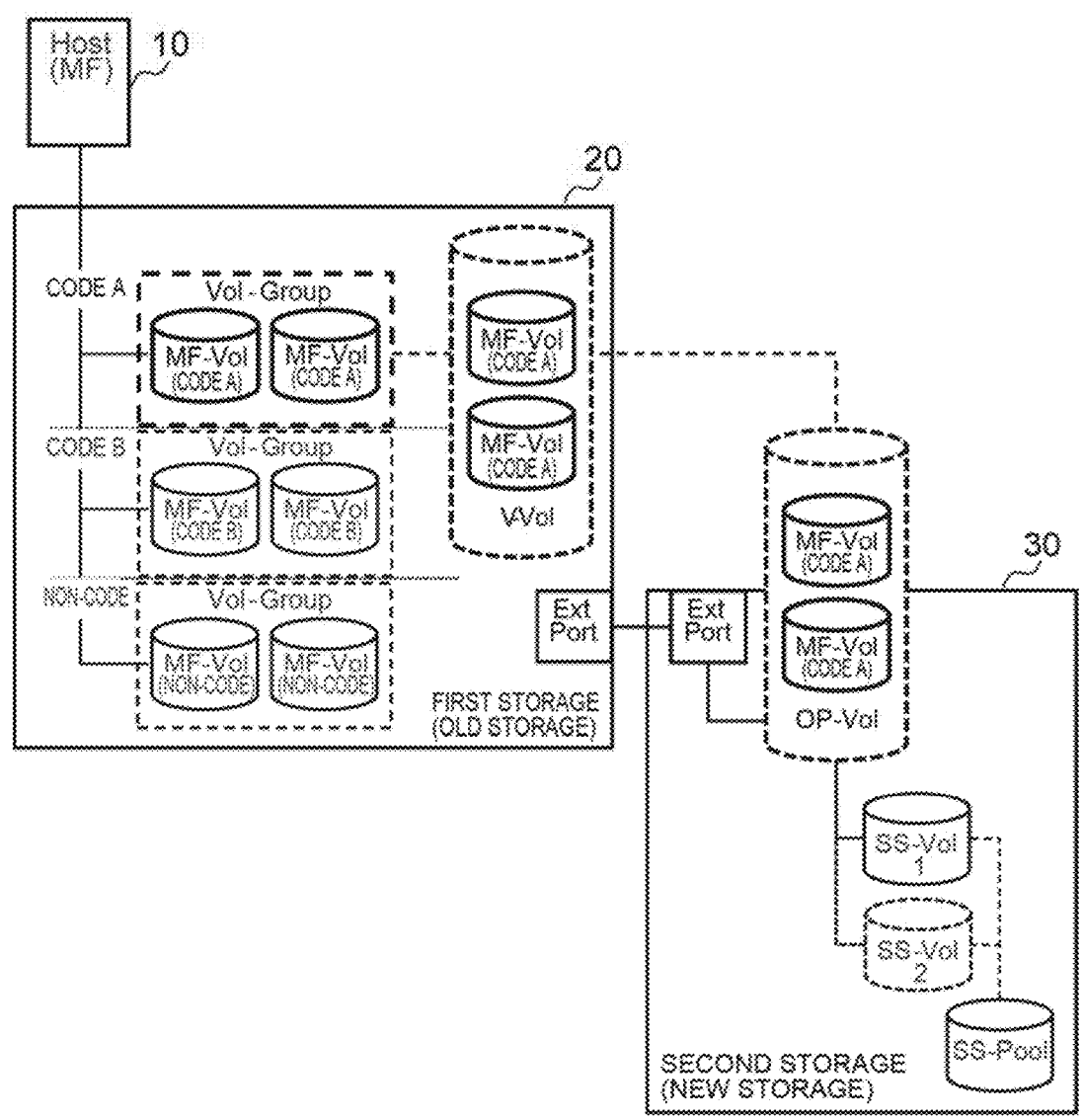
FIG. 22 is an explanatory diagram when forming a group for each Code setting.

FIG. 22 is an explanatory diagram when forming a group for each Code setting. In FIG. 22, the storage 20 of a mainframe environment has formed a Vol-Group including volumes encrypted with "Code A", a Vol-Group including volumes encrypted with "Code B", and a Vol-Group including volumes of "Non-Code" which are not encrypted. Furthermore, the storage 30 of an open environment externally connected to the storage 20 acquires and manages, for example, a snapshot of the Vol-Group of "Code A".

As described above, according to the storage system and data processing method disclosed in this embodiment, in a storage system in which a second storage (Storage #2) of an open system is externally connected to a first storage (Storage #1) of a mainframe system, the second storage comprises a second main volume (VOL #3) of an open environment generated in association with a main logical device (Parity Group #1) of the second storage, and a second sub volume (VOL #4) of an open environment generated in association with a sub logical device (Parity Group #2) of the second storage.

Moreover, the first storage comprises a first main volume (VOL #1) of a mainframe environment generated in association with the main logical device of the second storage, and a first sub volume (VOL #2) of a mainframe environment generated in association with the sub logical device of the second storage.

Furthermore, when the first storage receives a data processing request from a host, the first storage reflects the processing request in the second storage and thereby completes the processing and when the first storage receives an execution request of a prescribed function, the first storage causes the second storage to execute the function.

According to the foregoing configuration and operation, it is possible to constantly retain the latest data in the second storage, and the first storage can expand the functions of a mainframe environment by using the functions of an open environment of the second storage.

Moreover, the second storage performs generation management with the second main volume; when the first storage receives an execution request of a snapshot function, the first storage requests snapshot acquisition to the second storage via the first main volume; and when the second storage receives the snapshot acquisition request, the second storage maps designated snapshot data to the second sub volume, and additionally provides the snapshot data via the first sub volume associated with the second sub volume. Thus, the first storage of a mainframe system can use the snapshot function of the second storage of an open system.

Moreover, the first storage or the second storage identifies a volume to become an output destination of data based on an association of a volume of the first storage and a volume of the second storage, compensates a difference in a data length between the mainframe environment and the open environment and stores the data in a cache, and thereby transfers the data. Thus, data transfer between volumes of different data lengths can be easily realized.

Moreover, the storage system of this embodiment may also be configured such that a plurality of first main volumes is mapped to a single second main volume, and snapshot data of the plurality of first main volumes is acquired based on a single snapshot acquisition request from a host to the second main volume. According to the foregoing configuration and operation, it is possible to collectively manage a plurality of volumes.

Moreover, with the storage system of this embodiment, when the first storage receives a data write request from the host, the first storage stores designated data in a cache of the first storage, transfers the data to the second storage and, after the data is stored in a cache of the second storage, returns a reply of write complete to the host.

Moreover, when the first storage receives a data write request from the host, if there is data remaining in the cache of the second storage, the first storage stores data of the write request in a cache of the first storage, saves the data remaining in the second storage in the sub logical device, thereafter transfers the data of the write request to the second storage and, after the data is stored in the cache of the second storage, returns a reply of write complete to the host.

According to the foregoing operation, the storage system can reflect a write request in the second storage in real time.

Moreover, when the first storage receives a data write request from the host, the first storage may also immediately transfer designated data to the second storage and, after the data is stored in a cache of the second storage, return a reply of write complete to the host. According to the foregoing configuration, the time required up to write complete can be shortened.

Note that the present invention is not limited to the embodiment described above, and includes various modified examples. For example, the foregoing embodiment was explained in detail in order to facilitate the explanation of the present invention, and the present invention is not necessarily limited to a type comprising all of the configurations explained above. Moreover, in addition to deleting a certain configuration, a certain configuration may also be substituted or added.

REFERENCE SIGNS LIST

10: server, 20, 30: storage, 21, 31: cache memory, 22, 32: disk control unit, 23: control unit, 24: shared memory

The invention claimed is:

1. A storage system, comprising:
a first storage of a mainframe system; and
a second storage of an open system externally connected to the first storage of the mainframe system, wherein:
the second storage comprises:
  a main logical device;
  a sub logical device;
  a second main volume of an open environment generated in association with the main logical device of the second storage and
  a second sub volume of an open environment generated in association with the sub logical device of the second storage;
the first storage comprises:
  a first main volume of a mainframe environment generated in association with the main logical device of the second storage; and
  a first sub volume of a mainframe environment generated in association with the sub logical device of the second storage;
when the first storage receives a data processing request from a host, the first storage sends the processing request to the second storage and thereby completes the data processing request;
when the first storage receives an execution request of a prescribed function, the first storage causes the second storage to execute the prescribed function; and
when the first storage receives an execution request of a snapshot function, the first storage requests snapshot acquisition to the second storage via the first main volume, and the second storage maps designated snapshot data to the second sub volume.

2. The storage system according to claim 1, wherein:
the second storage performs generation management with the second main volume; and
when the second storage receives the snapshot acquisition request, the second storage maps the designated snapshot data to the second sub volume, and additionally provides the snapshot data via the first sub volume associated with the second sub volume.

3. The storage system according to claim 2, wherein:
a plurality of first main volumes is mapped to a single second main volume, and snapshot data of the plurality of first main volumes is acquired based on a single snapshot acquisition request from a host to the second main volume.

4. The storage system according to claim 1, wherein:
the first storage or the second storage identifies a volume to become an output destination of data based on an association of a volume of the first storage with a volume of the second storage, evaluates a difference in a data length between the mainframe environment and the open environment, and stores the data in a cache, and thereby transfers the data.

5. The storage system according to claim 1, wherein:
when the first storage receives a data write request from the host, the first storage stores designated data in a cache of the first storage, transfers the data to the second storage and, after the data is stored in a cache of the second storage, returns a reply of write complete to the host.

6. The storage system according to claim 5, wherein:
when the first storage receives a data write request from the host, if there is data remaining in the cache of the second storage, the first storage stores data of the write request in a cache of the first storage, saves the data remaining in the second storage in the sub logical device, thereafter transfers the data of the write request to the second storage and, after the data is stored in the cache of the second storage, returns a reply of write complete to the host.

7. The storage system according to claim 1, wherein:
when the first storage receives a data write request from the host, the first storage immediately transfers designated data to the second storage and, after the data is stored in a cache of the second storage, returns a reply of write complete to the host.

8. A data processing method in a storage system in which a second storage of an open system is externally connected to a first storage of a mainframe system, the method comprising:
the second storage generating a second main volume of an open environment in association with a main logical device of the second storage, and generating a second sub volume of an open environment in association with a sub logical device of the second storage;
the first storage generating a first main volume of a mainframe environment in association with the main logical device of the second storage, and generating a first sub volume of a mainframe environment in association with the sub logical device of the second storage;
the first storage, when the first storage receives a data processing request from a host, sending the processing request to the second storage and thereby completing the data processing request;
the first storage, when the first storage receives an execution request of a prescribed function, causing the second storage to execute the prescribed function; and
when the first storage receives an execution request of a snapshot function, the first storage requesting snapshot acquisition to the second storage via the first main volume, and the second storage mapping designated snapshot data to the second sub volume.

* * * * *